United States Patent
Viltard et al.

[11] Patent Number: 5,951,961
[45] Date of Patent: *Sep. 14, 1999

[54] PROCESS FOR TREATING A GAS CONTAINING HYDROGEN SULPHIDE AND SULPHUR DIOXIDE, COMPRISING A STEP FOR ELIMINATING SULPHUR BY COOLING A GASEOUS EFFLUENT

[75] Inventors: Jean-Charles Viltard, Valence; Claude Dezael, Maisons Laffitte; Fabrice Lecomte, Vincennes, all of France

[73] Assignee: Institut Francais Du Pétrole, France

[*] Notice: This patent is subject to a terminal disclaimer.

[21] Appl. No.: 08/929,444

[22] Filed: Sep. 16, 1997

[30] Foreign Application Priority Data

Sep. 16, 1996 [FR] France .................................. 96 11408

[51] Int. Cl.⁶ ............................ B01D 53/50; B01D 53/52
[52] U.S. Cl. .................... 423/575; 423/574.1; 423/576.2
[58] Field of Search .............................. 423/575, 574.1, 423/242.2, 576.2, 222, 226; 95/235

[56] References Cited

U.S. PATENT DOCUMENTS

| | | | |
|---|---|---|---|
| 2,881,047 | 4/1959 | Townsend | 423/575 |
| 3,796,796 | 3/1974 | Deschamps et al. | 423/575 |
| 3,832,454 | 8/1974 | Renault et al. | 423/574 |

FOREIGN PATENT DOCUMENTS

| | | | |
|---|---|---|---|
| 2 122 674 | 1/1971 | France . | |
| 2 336 163 | 12/1975 | France . | |
| 2 411 802 | 12/1977 | France . | |
| 51-16187 | 5/1976 | Japan | 423/226 |
| 2 012 806 | 8/1979 | United Kingdom . | |

*Primary Examiner*—Gary P. Straub
*Assistant Examiner*—Timothy C Vanoy
*Attorney, Agent, or Firm*—Miller, White, Zelano, & Branigan, P.C.

[57] ABSTRACT

In a process and apparatus for treating a gas containing hydrogen sulphide and sulphur dioxide, the gas is contacted with an organic solvent (1)for example, a polyalkylene glycol, containing a catalyst for example, an alkaline salt of a week organic acid, in at least one gas-liquid reactor contactor (2) and a gas (20) substantially no longer containing hydrogen sulphide and sulphur dioxide is recovered. The effluent contains sulphur vapor. It is cooled by mixing with a solvent-water mixture (14) or by cooled solvent in a cooling zone (7) to produce a suspension of sulphur crystals in the solvent. The crystallised sulphur is separated from the solvent in a separation zone (30) and the cooled solvent is recycled (13). An effluent (17) which is free of sulphur gas is obtained.

9 Claims, 1 Drawing Sheet

PROCESS FOR TREATING A GAS CONTAINING HYDROGEN SULPHIDE AND SULPHUR DIOXIDE, COMPRISING A STEP FOR ELIMINATING SULPHUR BY COOLING A GASEOUS EFFLUENT

BACKGROUND OF THE INVENTION

The present invention concerns a process and apparatus for treating a gaseous effluent from a Claus plant or a gas containing hydrogen sulphide and sulphur dioxide.

In particular, it concerns the treatment of effluents from Claus plants particularly from hydrodesulphurization and catalytic cracking units. It also concerns the purification treatment of natural gas.

The prior art is illustrated by French patent applications FR-A-2 411 802 and FR-A-2 336 163.

The Claus process is widely used to recover elemental sulphur from gaseous feeds containing hydrogen sulphide ($H_2S$). However, the fumes emitted from these Claus type plants, even after several catalytic stages, contain non-negligible amounts of acid gases. Those effluents (tail gases) from Claus plants must, therefore, be treated to eliminate the majority of toxic compounds so as to satisfy anti-pollution regulations. These regulations are becoming more and more strict and existing technology must be constantly improved.

As an example, about 95% by weight of the sulphur present can be recovered from a Claus plant; treatment of this Claus plant tail gas (using a Clauspol unit, for example) can recover 99.8% by weight of the sulphur, for example, using the reaction:

$$2H_2S + SO_2 \rightarrow 3S + 2H_2O$$

which uses a reaction medium constituted by an organic solvent and a catalyst comprising an alkaline or alkaline-earth salt of an organic acid. The reaction is generally carried out in counter-current mode in a reactor-contactor and its temperature is controlled by passing the solvent which is extracted from the lower end of the reactor by a circulating pump through a heat exchanger to encourage the highest possible degree of conversion to sulphur while avoiding the formation of solid sulphur. Sulphur is thus recovered in liquid form. While it is very effective, the process is limited by various constraints:

The thermodynamic equilibrium of the reaction is such that the reaction is never complete. Some hydrogen sulphide and sulphur dioxide remains, in equilibrium with the sulphur and water which are formed. The quantity of sulphur present in unreacted $H_2S$ and $SO_2$ which is found in the reaction effluent (from the Clauspol) corresponds to about 0.1% of the total sulphur in the initial feed to the Claus plant. Better conversion can be envisaged at a lower operating temperature but this temperature must be kept above the freezing point of sulphur (about 120° C.) otherwise the reactor will be blocked with solid sulphur;

The presence of unseparated liquid sulphur in the reactor-contactor, which is entrained in the solvent and catalyst which circulate, and which is recycled to the reactor-contactor. Not all of the droplets of liquid sulphur are separated from the solvent and the presence of liquid sulphur irremediably causes the presence of gaseous sulphur in the effluent due to the vapor pressure of sulphur. As an example, the quantity of unrecovered sulphur which can be attributed to vapor pressure is about 0.1% by weight of the sulphur in the initial feed.

The aim of the invention is to overcome the disadvantages of the prior art.

A further aim of the invention is to satisfy the strictest regulations designed to counter atmospheric pollution by sulphur-containing compounds.

A yet still further aim of the invention is to be able to modify existing installations with a Claus plant and a unit for treating the effluents from that unit (a Clauspol unit), at very low cost.

It has been shown that by eliminating all of the sulphur vapor from the effluents from gas treatment units, for example Claus plant tail gas, up to 99.9% of the total sulphur can be recovered and thus the quantity of sulphur discharged into the atmosphere when the gas is incinerated can be minimised.

SUMMARY OF THE INVENTION

More precisely, the invention concerns a process for the treatment of a gas containing hydrogen sulphide and sulphur dioxide, in which the gas is brought into contact with an organic solvent containing a catalyst in at least one gas-liquid reactor-contactor at a suitable temperature, and a gaseous effluent which substantially no longer contains hydrogen sulphide and sulphur dioxide but which contains sulphur in vapor form is recovered, the process being characterized in that the gaseous effluent from the reactor-contactor is brought into contact with the same organic solvent or with another organic solvent at a temperature which is lower than the solidification temperature of sulphur (for example 95° C.) in a contactor-cooler.

In more detail, the gaseous effluent is cooled in the presence of at least one organic solvent in at least one cooling zone so as to obtain a suspension of sulphur crystals in said solvent, the sulphur is separated from the solvent in at least one separation zone and a gas containing water and substantially no longer containing sulphur vapor is recovered, also a solvent is recovered which is depleted in sulphur which is recycled to the cooling zone, and sulphur is recovered from said separation zone.

The organic solvent can be cooled in different ways:

In a first variation, if the organic solvent is miscible with water, it can be cooled by heat exchange in a heat exchanger before being mixed with the gaseous effluent to be purified, by adding water at a temperature which is lower than that of the organic solvent, wherein the heat of vaporization on contact with the gaseous effluent can reduce the temperature of the mixture, or by a combination of the above two steps. Cooling is preferably by injection of water.

In a second variation, if the organic solvent is not miscible with water, it can be cooled in the same manner as in the first variation. Cooling is preferably by heat exchange.

The following different types of solvents can be used:

In the category of solvents which are insoluble in water are hydrocarbons with boiling points at atmospheric pressure of more than 200° C., preferably dodecane, tridecane, and naphtha with boiling points in the range 225° C. to 335° C.

In the category of solvents which are soluble in water, with boiling points at atmospheric pressure of more than 200° C. are polyols containing 3 to 15 carbon atoms, preferably glycerol, thioglycol and cyclohexanedimethylethanol, acid esters containing 5 to 15 carbon atoms, more particularly trimethylpentanediol mono-isobutyrate and dimethyl adipate, glycol ethers containing 5 to 15 carbon atoms, advantageously butoxytriglycol, ethoxytriglycol, diethylene glycol butylether, ethylene glycol phenylether, terpinyl ethylene glycol monobenzyl ether, ethylene glycol butylphenylether, diethylene glycol, diethylene glycol dimethylether, diethylene glycol dibutylether, triethylene glycol, tetraethylene glycol dimethylether, propylene n-butylether, dipropylene n-butylether, tripropylene n-butylether, and polyethylene glycol with a molar mass of 200, 300, 400 or 600.

The gaseous effluent in contact with the organic solvent containing water can be cooled to a temperature which is lower than the melting point of sulphur, preferably between 50° C. and 100° C. The water contributes to this cooling as it can partially evaporate from the solution in contact with the hot gas.

During cooling, the sulphur vapor solidifies and in accordance with a further feature of the invention, the three-phase mixture of gas, solid sulphur and liquid organic solvent is sent to a contactor where the liquid captures all of the solid particles which are in suspension.

In a further feature of the invention, sulphur can be separated from the solvent for recycling to the principal reactor-contactor in liquid form after melting, or it can be recovered in a minimum quantity of solvent.

The solvent, depleted in sulphur, leaving the separation zone can be introduced into at least one filter or hydrocyclone to free it of at least a portion of the sulphur crystals before being introduced into the contact and cooling zone.

Advantageously, the solvent phase recovered from the separation zone is recycled to the cooling zone.

The process of the invention and the means for carrying out the invention can be adapted to the conventional process and apparatus for treatment of Claus plant tail gases.

Thus the reactor-contactor generally comprises a heat exchanger or equivalent heating means in its lower portion, more precisely in its settling zone. At least a portion of the sulphur which has been separated from the solvent during the separation step can be introduced therein, and liquid sulphur can be extracted from the settling zone of the reactor-contactor. Existing units can thus be revamped.

The most frequently used solvents are mono- or polyalkylene glycols, esters of mono- or poly-alkylene glycols or ethers of mono- or polyalkylene glycols such as those described in French patents FR-A-2 115 721 (United States patent U.S. Pat. No. 3,796,796), FR-A-2 122 674 and FR-A-2 138 371 (U.S. Pat. No. 3,832,454), which are hereby incorporated by reference. The catalysts are normally those described in those patents, more particularly the alkaline salts of weak organic acids such as benzoic acid and salicylic acid.

In accordance with one characteristic of the process, at least a portion of a single-phase solution of said organic solvent can be extracted from the lower portion of the reactor-contactor, and cooled to eliminate at least a portion of the heat of reaction released in the reactor-contactor, and recycled to the reactor-contactor.

For a vertical reactor, there are two variations of the process:

The gas to be treated is a co-current with the solvent. In this case, the gas to be treated is introduced to the head of the reactor-contactor along with the recycled solvent originating from a side stream extracted from the lower portion of the reactor. The gaseous effluent is also extracted as a side stream from the lower portion of the reactor, above the solvent to be recycled.

The gas to be treated is a counter-current to the solvent. In this case, the gas to be treated is introduced as a side stream to the lower portion of the reactor-contactor, and the solvent originating from the lower portion of the reactor is recycled to the upper portion as a side stream. Sulphur is recovered from the bottom of the reactor and the gaseous effluent for cooling is extracted overhead.

However, the process can be carried out in a horizontal reactor.

The invention also concerns an apparatus for treating a gas containing hydrogen sulphide and sulphur dioxide. This apparatus comprises a liquid-gas reactor-contactor, means for supplying gas to be treated and means for supplying an organic solvent containing a catalyst, means for recovering sulphur and outlet means for a gaseous effluent containing sulphur in vapor form, the apparatus being characterized in that it comprises at least one means for contacting and cooling the gaseous effluent, delivering a three-phase effluent, having an inlet connected to the effluent outlet means and to means for recycling a cooling solvent, means for separating said three-phase effluent connected to the cooling means adapted to separate purified gas from sulphur and comprising means for evacuating purified gas, means for extracting sulphur and means for recovering solvent connected to the means for recycling the cooling solvent.

The term "means for contacting and cooling" means a cooling or contacting zone into which the effluent and solvent are introduced, the temperature of the latter being lower than that of the effluent.

In a first variation, the cooling solvent recycling means comprises a heat exchanger adapted to cool said mixture before it is brought into contact with the gaseous effluent to be purified from the reactor-contactor.

In a second variation, the means for recycling cooling solvent comprises a cold water supply which helps to cool the solvent, and optionally a heat exchanger.

In a further characteristic of the apparatus, it is of advantage to locate means for bringing the effluent from the cooling zone into contact with a contact packing at the outlet to the cooling zone, to ensure transfer of solid sulphur into the liquid phase.

The organic cooling solvent, cooled by heat exchange and/or by addition of water, can still contain suspended sulphur. It can be separated by suitable separation means (a filter or hydrocyclone, for example, not shown) and can be recovered while the desaturated and cooled solvent is recycled to the cooling zone to cool the gaseous effluent.

The invention will be better understood from the accompanying drawing which schematically illustrates a number of implementations of the process, and in which:

DETAILED DESCRIPTION OF THE INVENTION

Figure 1:
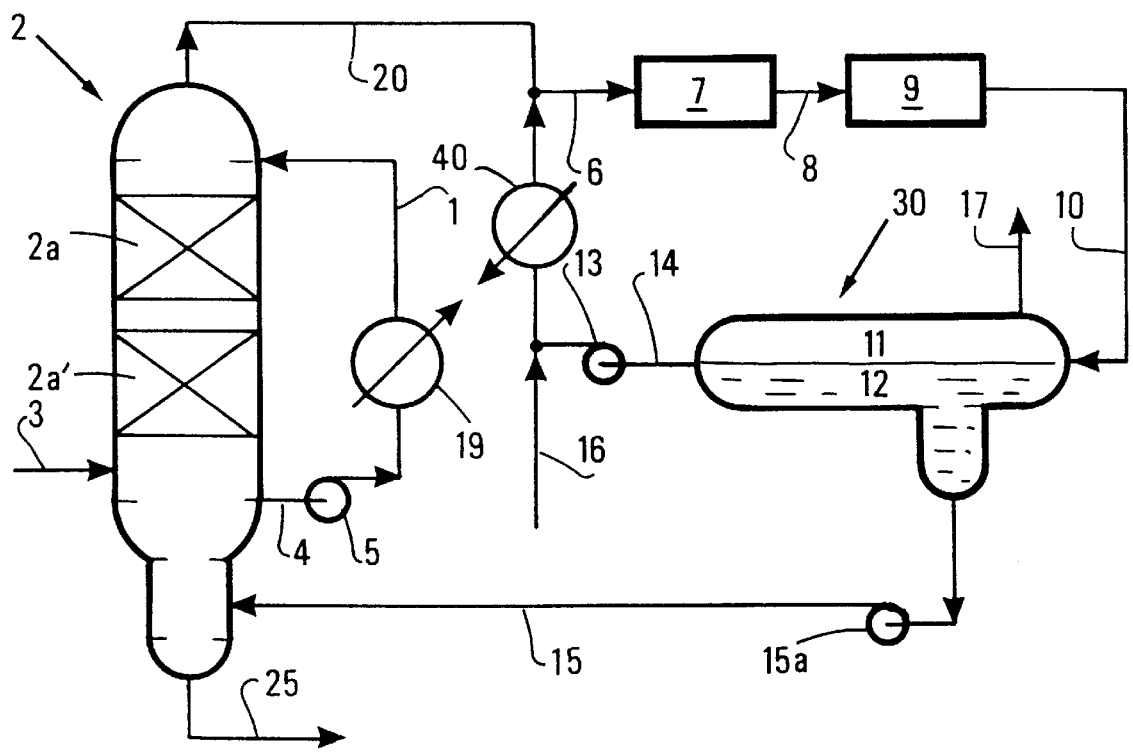
FIG. 1 shows an apparatus for treating sulphur-containing gas comprising a zone for cooling a gaseous effluent containing sulphur followed by a sulphur separation zone.
Figure 2:
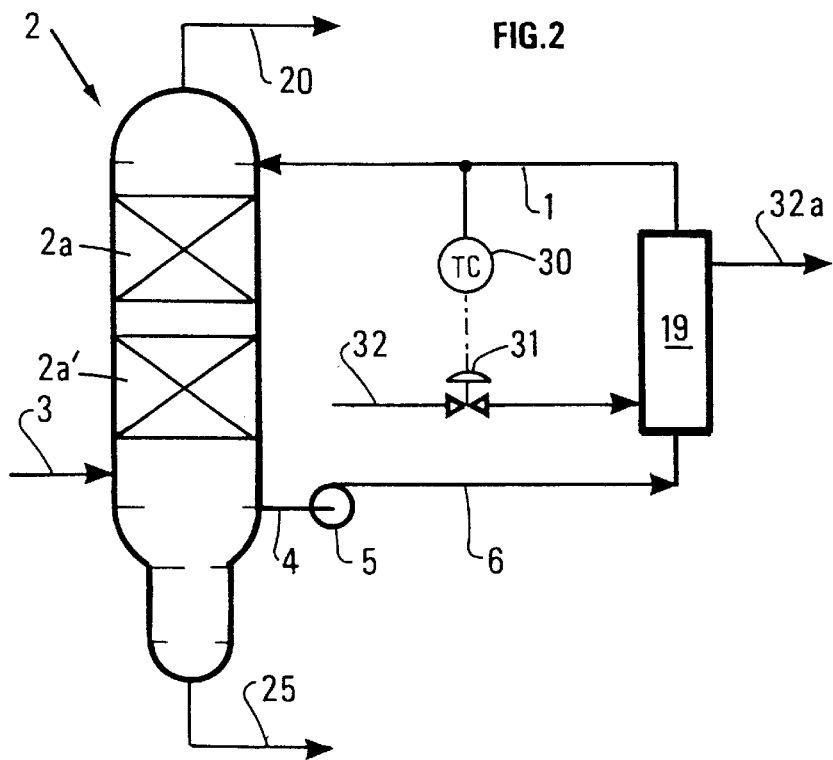
FIG. 2 shows the prior art.

The apparatus of FIG. 1 comprises a gas-liquid reactor-contactor (2) preferably a vertical reactor, which advantageously operates in counter-current mode at a temperature of 120° C., for example, and contains two beds 2a and 2a' containing a ceramic packing (Intalox saddles or Raschig rings, for example).

A line 3 supplies a side stream of sulphur-containing feed, for example an effluent from a Claus plant, to the lower portion of the reactor-contactor below the packing, while a line 1 introduces a recycled solvent solution, for example polyethylene glycol 400, and a catalyst, for example sodium salicylate, as a side stream to its upper portion above the packing,.

The purified gas generally containing 300 ppm of sulphur vapor and water vapor is evacuated from the upper portion of the reactor-contactor via a line 20.

This effluent 20 from the reactor-contactor is cooled by a mixture of a glycolated solution, the same PEG 400 solvent, for example, originating from a line 14 equipped with a pump 13 and additional water provided via a line 16. Effluent 20 can also be cooled by contact with the solvent (PEG 400) cooled by a heat exchanger 40. The mixture is introduced via line 6 into a contactor cooler 7, where the water evaporated to equilibrium cools the gaseous effluent to 95° C., for example. The sulphur vapor passes into the solid state in the glycolated solution which is already saturated with sulphur. Passage of the sulphur into the liquid phase is thus carried out in the multi-functional contactor 7 which has sufficient contact characteristics. However, contact can be improved by passing the effluent from the contactor-cooler via a line 8 into a further contactor 9 comprising a suitable contact mass, for example Intalox saddles. Contactors 7 and 9 can be combined in a single apparatus.

The effluent from contactor 9 is sent via a line 10 to a three-phase separator 30 where complete separation of gas 11 and liquid 12 is effected, also partial separation of the solid from the liquid. The purified gas is extracted overhead from separator 30 via a line 17. A phase which is rich in sulphur and containing a small quantity of solvent is extracted from the bottom of three-phase separator 30 and sent via a line 15 and pump 15*a* to the lower end of reactor-contactor 2 to be melted at about 125° C. A line 25 evacuates the completely melted sulphur from the reactor.

In addition, at least a portion of a single-phase solution of solvent and catalyst is extracted from the bottom of reactor 2 via a line 4, and recycled using pump 5 via line 1 to the upper portion of the reactor-contactor as a side stream after cooling in heat exchanger 19. In a variation which is not shown, after cooling, the solvent contains sulphur in suspension which is separated in a hydrocyclone, and the solvent which is then depleted in sulphur is introduced into the cooling zone 7 to cool the gaseous effluent 20.

The invention will be better understood from the following examples:

COMPARATIVE EXAMPLE 1 (FIG. 2)

A Claus plant tail gas was introduced via a line 3 at a rate of 12300 Nm³/h into a vertical reactor-contactor constituted by a column 2 containing two packing beds 2*a* and 2*a'* and brought into contact at 125° C. with an organic solvent containing a soluble catalyst introduced via line 1.

The packing used in this example was constituted by two beds of saddles (Intalox, ceramic, with a specific surface area of 250 m²/m³) and capable of retaining the small quantities of sodium salts formed during the reaction.

The organic solvent used was a polyethylene glycol with a molecular weight of 400 and the soluble catalyst was sodium salicyate at a concentration of 100 millimoles/kg of solvent.

The solvent was recycled between the bottom and top of the reactor at a rate of 500 m³/h via lines 4 and 1 using circulating pump 5 and through a heat exchanger 19, the temperature being controlled and regulated by measurement and control system 30 and 31*a* which could inject hot water at 80° C. into the exchanger via line 32, and evacuate it via line 32*a*. The temperature of the recycled solvent was 123° C.

The purified gas left the reactor via line 20. The sulphur formed settled at the bottom of the reactor and was extracted via line 25 at a rate of 332 kg/h.

The compositions of the inlet and outlet gases to and from the unit are given in the following table:

| Constituents | Inlet gas (3) vol % | Outlet gas (20) vol % |
|---|---|---|
| $H_2S$ | 1.234 | 0.014 |
| $SO_2$ | 0.617 | 0.007 |
| $CO_2$ | 4.000 | 4.038 |
| COS | 0.015 | 0.009 |
| $CS_2$ | 0.015 | 0.009 |
| $S_v$* | 0.14 | 0.03 |
| $N_2$ | 60 | 60.396 |
| $H_2O$ | 34 | 35.384 |
| Sum of sulphur-containing compounds (expressed as sulphur) | 2.036 | 0.065 |

*$S_v$ = sulphur vapor + vesicular sulphur.

The yield of sulphur-containing compounds in the reactor was:

$$\frac{(\% \text{ of sulphur-containing compounds at inlet} - \% \text{ of sulphur-containing compounds at outlet})}{\% \text{ of sulphur-containing compounds at inlet}} \times 100 =$$

$$\frac{(2.036 - 0.078)}{2.036} \times 100 = 96.2\%$$

The yield of the Claus plant assembly with 94% yield+ prior art finishing unit was:

$$94 + \frac{(6 \times 96.2)}{100} = 99.77\%$$

EXAMPLE 2 (FIG. 1)

The reactor of Example 1, containing two beds of ceramic Intalox saddles, was used to effect contact between the Claus plant tail gas and the same solvent containing the same soluble catalyst.

The Claus plant tail gas was introduced at the same rate (12300 Nm₃/h) via line 3 and the solvent containing the catalyst was introduced via line 1 at a rate of 500 m³/h using pump 5, the temperature of the solvent being kept at 125° C. using exchanger 19.

The gaseous effluent from the reactor was mixed with a mixture of glycolated solution and additional cold water introduced into a cooling contactor 7 via line 16 where the water evaporated to equilibrium cooled the gaseous effluent to 95° C. the sulphur vapor passed into the solid state in apparatus 7.

Passage of the sulphur into the liquid phase which was a glycolated solution already saturated with sulphur was effected in apparatus 9 which contained a contact mass constituted by Intalox saddles.

The effluent from contactor 9 was sent to three-phase separator 30 where the gas-liquid and solid sulphur-liquid separations were carried out.

The sulphur-rich phase was sent to the separating and melting section of the reactor-contactor at 125° C. where it was recovered and melted and where it joined the principal production from the reactor.

The compositions of the inlet and outlet gases to and from the unit are given in the following table:

| Constituents | Inlet gas (3) vol % | Outlet gas (17) vol % |
|---|---|---|
| H₂S | 1.234 | 0.014 |
| SO₂ | 0.617 | 0.007 |
| CO₂ | 4.000 | 4.038 |
| COS | 0.015 | 0.006 |
| CS₂ | 0.015 | 0.004 |
| S$_v$* | 0.14 | 0.03 |
| N₂ | 60 | 60.396 |
| H₂O | 34 | 35.384 |
| Sum of sulphur-containg compounds | 2.036 | 0.038 |

The yield of sulphur-containing compounds in the reactor was:

$$\frac{(2.036 - 0.038)}{2.036} \times 100 = 98.13\%$$

The yield of the claus plant assembly with 94% yield+ finishing unit was:

$$94 + \frac{(6 \times 98.13)}{100} = 99.88\%$$

We claim:

1. A process for the treatment of a gas containing hydrogen sulphide and sulphur dioxide, comprising contacting the gas (3) with an organic solvent (1) containing a catalyst in at least one gas-liquid reactor-contactor (2) at a suitable temperature, to form a gaseous effluent (20) which contains water vapor, sulphur vapor and diminished amounts of hydrogen sulphide and sulphur dioxide; cooling said gaseous effluent (20) to a temperature below the solidification temperature of sulfur, by at least one organic solvent in at least one cooling zone (7) so as to obtain a suspension of sulphur crystals in said solvent; separating the sulphur from the solvent in at least one separation zone (30); recovering from said separation zone, a gas containing water and diminished amounts of sulphur vapor, sulphur and a solvent depleted in sulphur; and recycling said solvent depleted in sulphur to said cooling zone.

2. A process according to claim 1, in which the organic cooling solvent is cooled by heat exchange in a heat exchanger (40).

3. A process according to claim 1, in which the organic cooling solvent is cooled by adding water (16) at a temperature which is lower than that of the organic solvent.

4. A process according to claim 1, in which the gaseous effluent is cooled to between 50° C. and 100° C.

5. A process according to claim 1, in which the sulphur recovered from the separation zone (30) in a minimal quantity of solvent is recycled in suspension to the bottom of the reactor-contactor (2).

6. A process according to claim 1, in which the solvent which is depleted in sulphur leaving the separation zone (30) is introduced into at least one filter or at least one hydrocyclone to free at least a portion of the sulphur crystals before being introduced into the cooling zone (7).

7. A process according to claim 6, in which at least part of said organic solvent from the bottom portion of the reactor-contactor (2) is cooled to eliminate at least a portion of the heat of reaction released in the reactor-contactor, and the resultant cooled solution is recycled (1) to the reactor-contractor.

8. A process according to claim 1, in which the organic solvent (1) and the organic cooling solvent are the same solvent.

9. A process according to claim 1, in which the organic cooling solvent, cooled by heat exchange and/or by adding water, contains sulphur in suspension, said sulphur is separated from the organic cooling solvent and said gaseous effluent (20) is cooled by the organic solvent which is depleted in sulphur.

* * * * *